Patented Nov. 20, 1928.

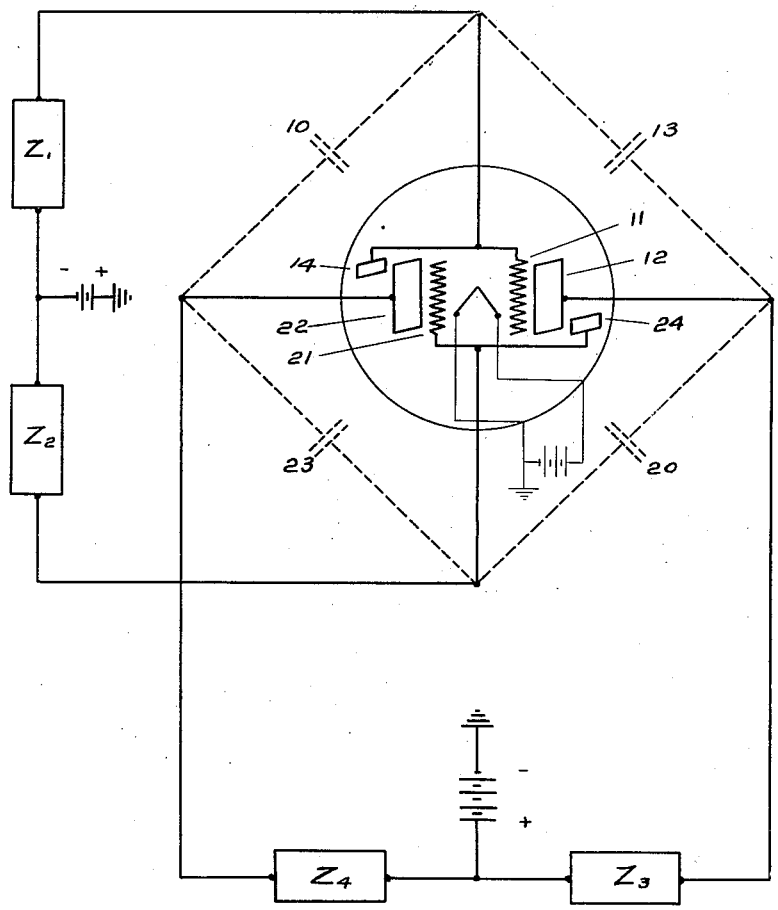

1,691,946

UNITED STATES PATENT OFFICE.

JACK R. TOLMIE AND TYNG M. LIBBY, OF SEATTLE, WASHINGTON.

AUDION.

Application filed February 11, 1926. Serial No. 87,504.

This invention relates to a method and means for capacitatively coupling the grid and plate circuits of audions. The term "audion" as used in this application, refers to any electric amplifying device containing an input electrode, referred to as the "grid"; an output electrode, referred to as the "plate"; and a common electrode, referred to as the "filament"; the electric power output being controlled electrostatically by the input voltage between the grid and filament.

Capacity coupling between the grid and plate circuits of an audion amplifier may result in the production of undesired electric oscillations. In some cases regeneration without the production of oscillations may be desirable in the audion amplifier, thereby increasing the amplification of the voltages impressed on the grid of the audion.

In the application of audions as wave detectors and as oscillators a capacity coupling, between the grid and plate circuits, greater than the inherent capacity coupling between the grid and plate electrodes may be desirable.

To those versed in the art, it is well known that in audions, the inherent capacities between the electrodes and the capacitance and inductance of wires connected thereto limits the maximum electric wave frequency that may be amplified by audions. A method of eliminating feed-back current due to grid-plate capacitance of the audion is described in Patent No. 1,560,332, issued to Ballantine, wherein two audions are connected in the push-pull manner with auxiliary or neutralizing condensers connected externally to the audions. The stray capacitance and inherent inductance of the connections external to the audions limits the maximum electric wave frequency at which the system will amplify.

The object of this invention is to provide a method and means for capacitatively coupling the grid and plate circuits of audions whereby this capacity coupling can be given any value between the limits zero and unity coupling without increasing the inherent capacitance and inductance of the system due to the addition of auxiliary condensers and connecting wire.

The object of this invention is attained by the use of a five-electrode audion having two input electrodes or "grids", two output electrodes or "plates", a common electrode or "filament", and an auxiliary capacitance between each grid and its remote plate, the said auxiliary capacities being embodied within the structure of the audion.

The principle of this invention may be understood from the following general analysis. In the ordinary "push pull" audion circuit, the grid and plate circuits are capacitatively coupled by the capacity between the grid and plate electrodes in each audion. By employing two similar audions and connecting an auxiliary capacity between the grid of each audion and the plate of the other audion, there results a capacity bridge in which two arms are provided by the inherent capacities between grid and plate electrodes and two arms are provided by the added auxiliary capacities. The grid or input circuit is connected between one pair of diagonally opposite corners of the bridge, and the plate or output circuit is connected between the other pair of diagonally opposite corners. If now, the four capacities between the grid and plate electrodes are all made equal one to the other, the capacity bridge will have been balanced, and the grids are at equipotential points with respect to the plates. Hence, the capacity coupling between the grid and plate circuits will have been eliminated. Since the four arms of the bridge are composed of like reactances, the balance of the bridge will hold for all frequencies of current.

By increasing the value of the added balancing capacities in the bridge just described, any desired degree of coupling between grid and plate circuits may be obtained, and by employing the proper kind and values of impedances in the grid and plate circuits, regeneration and electric oscillations may be produced thereby. By similar audions in this discussion and those that follow is meant audions having substantially equal amplification constants, equal mutual conductances, and equal plate impedances.

Referring now to the drawings and the following description, from which a more complete understanding of the invention may be had:

The figure is a diagram of a special five-electrode audion wherein the inherent capacities between the grid 11 and the plate 22, and between the grid 21 and the plate 12, are augmented by the grid extensions 14 and 24 respectively. The inherent capacities between the grids and adjacent plate electrodes are represented by the elements 13 and 23, while the inherent capacities between the grids and remote plate electrodes are represented by the elements 10 and 20. The grid circuit impedances $Z_1$ and $Z_2$ are equal in kind and value, as are also the plate circuit impedances $Z_3$ and $Z_4$.

If the capacities 10, 20, 13 and 23 are all made equal, there results a balanced capacity bridge in which the grid circuit is connected to equipotential points with respect to the plate circuit, and no variation in grid potential will be produced by a variation in plate potential. Hence, the undesirable capacity coupling will have been eliminated.

If the capacity of either or both 10, 20 be increased the balance of the bridge will have been destroyed and the grid and plate circuits will have been capacitatively coupled. Since the capacities 10, 20 may be made very large with respect to 13, 23, any desired degree of coupling between the limits zero and unity may be obtained thereby.

The principle and effectiveness of the above arrangement will in no way be altered if an impedance of any character is connected in parallel with $Z_1$ and $Z_2$ combined or with $Z_3$ and $Z_4$ combined, or with $Z_1$ and $Z_2$ combined and $Z_3$ and $Z_4$ combined.

Likewise, it should be apparent to those versed in the art, that the degree of coupling will not vary with impressed frequency, since all four arms of the bridge are of like impedances.

The coupling capacities 13 and 23 are usually very small, and it might be unconvenient to provide equal balancing capacities 13 and 23, since they would be affected in value by the length of connecting wires and they might be difficult to adjust. In this case the inherent capacities 13 and 23 may be augmented by connecting additional capacities in parallel therewith, thus permitting an increase in the balancing capacities 10 and 20.

It may be necessary to exercise care, in the construction of the amplifier, to prevent disturbing of the bridge balance by parasitical capacities between the high potential ends of the impedances $Z_1$, $Z_2$, $Z_3$, $Z_4$ and the ground and conductors in their proximity.

The grid extensions 14 and 24 have been illustrated in the figure as small wings of a plate-like character, and while we may refer to them as wings or grid extensions, yet it should be understood that such references and illustrations are of the function rather than of the mechanical characteristics of the element. It is well known that capacitative coupling is had between elements of various shapes and sizes, and including lead-in wires, etc., hence it will be evident that, in the construction of the audion these wings 14 and 24 may come to assume any shape or size, and need only be so located with respect to the plates 12 or 22, as to perform the functions explained above.

What we claim as our invention is:

An audion comprising an enveloping casing, a filament, two grids, two plates, and two wings contained therein, said plates and wings being arranged in pairs, one of said grids being connected within the envelope with a remote wing, and the other grid being similarly connected with the other remote wing.

Signed at Seattle, King County, Washington, this 6th day of February, 1926.

JACK R. TOLMIE.
TYNG M. LIBBY.